United States Patent
Cheverton et al.

(10) Patent No.: US 10,112,262 B2
(45) Date of Patent: Oct. 30, 2018

(54) SYSTEM AND METHODS FOR REAL-TIME ENHANCEMENT OF BUILD PARAMETERS OF A COMPONENT

(71) Applicant: General Electric Company, Schenectady, NY (US)

(72) Inventors: Mark Allen Cheverton, Mechanicville, NY (US); Marie Ann McMasters, Mason, OH (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 823 days.

(21) Appl. No.: 14/525,711

(22) Filed: Oct. 28, 2014

(65) Prior Publication Data
US 2016/0114431 A1    Apr. 28, 2016

(51) Int. Cl.
*B23K 26/00* (2014.01)
*B23K 26/03* (2006.01)
(Continued)

(52) U.S. Cl.
CPC .......... *B23K 26/342* (2015.10); *B23K 26/032* (2013.01); *B23K 26/034* (2013.01);
(Continued)

(58) Field of Classification Search
CPC .... B23K 26/032; B23K 26/034; B23K 26/03; B23K 26/04; B23K 31/125; B23K 26/0643
(Continued)

(56) References Cited

U.S. PATENT DOCUMENTS

| 5,155,329 A | 10/1992 | Terada et al. | |
| 5,192,980 A * | 3/1993 | Dixon | G01J 3/30 250/458.1 |

(Continued)

FOREIGN PATENT DOCUMENTS

| EP | 2032345 B1 | 5/2010 | |
| JP | WO 2013115383 A1 * | 8/2013 | ......... G02B 21/0032 |
| WO | 2012000650 A1 | 1/2012 | |

OTHER PUBLICATIONS

Kruth et al, Feedback Control of Selective Laser Melting, Proceedings of the 3rd International Conference on Advanced Research in Virtual and Rapid Prototyping, Sep. 2007, pp. 521-527.

*Primary Examiner* — Dana Ross
*Assistant Examiner* — Lawrence Samuels
(74) *Attorney, Agent, or Firm* — GE Global Patent Operation; John P. Darling

(57) ABSTRACT

A direct metal laser melting (DMLM) system includes a laser device configured to generate a melt pool in a powder bed based on a build parameter. In addition, the DMLM system includes a confocal optical system directed at the melt pool and configured to receive an optical signal emitted by the melt pool. The DMLM system further includes an optical sensor operatively coupled to the confocal optical system that is configured to receive the optical signal and to generate an electrical signal in response to the optical signal. A computing device is configured to receive the electrical signal from the optical sensor and to generate a control signal in response. The control signal is configured to modify the build parameter of the direct metal laser melting system in real-time to adjust at least one of a melt pool size and a melt pool temperature to achieve a desired physical property of the component.

18 Claims, 6 Drawing Sheets

(51) Int. Cl.
  *B23K 26/342* (2014.01)
  *G01J 5/06* (2006.01)
  *G01J 5/00* (2006.01)
  *G01J 5/08* (2006.01)
  *B33Y 10/00* (2015.01)
  *B33Y 30/00* (2015.01)
  *B33Y 50/02* (2015.01)
  *B22F 3/105* (2006.01)

(52) U.S. Cl.
  CPC .............. *G01J 5/004* (2013.01); *G01J 5/06* (2013.01); *G01J 5/0831* (2013.01); *B22F 2003/1056* (2013.01); *B22F 2003/1057* (2013.01); *B33Y 10/00* (2014.12); *B33Y 30/00* (2014.12); *B33Y 50/02* (2014.12); *G05B 2219/36199* (2013.01); *G05B 2219/45041* (2013.01); *Y02P 10/295* (2015.11)

(58) Field of Classification Search
  USPC .... 219/121.83, 121.63, 121.64, 121.85, 76.1
  See application file for complete search history.

(56) References Cited

U.S. PATENT DOCUMENTS

| | | | |
|---|---|---|---|
| 5,272,312 A | 12/1993 | Jurca | |
| 5,427,733 A | 6/1995 | Benda et al. | |
| 5,674,415 A | 10/1997 | Leong et al. | |
| 6,188,041 B1 | 2/2001 | Kim et al. | |
| 6,444,947 B1 | 9/2002 | Bonss et al. | |
| 6,600,129 B2* | 7/2003 | Shen .................. | B29C 67/0077 219/121.61 |
| 6,670,574 B1 | 12/2003 | Bates et al. | |
| 6,815,636 B2 | 11/2004 | Chung et al. | |
| 6,925,346 B1 | 8/2005 | Mazumder et al. | |
| 7,095,556 B2* | 8/2006 | Iketaki .................. | G02B 26/08 250/458.1 |
| 7,380,697 B2 | 6/2008 | Seki et al. | |
| 7,863,544 B2* | 1/2011 | Serruys ................ | B23K 26/032 219/121.83 |
| 8,246,185 B2 | 8/2012 | Pfitzner | |
| 2005/0252895 A1 | 11/2005 | Schuermann et al. | |
| 2008/0078752 A1* | 4/2008 | Bischoff ................ | A61F 9/008 219/121.72 |
| 2009/0046298 A1* | 2/2009 | Betzig ................ | G01N 21/6445 356/521 |
| 2009/0152771 A1 | 6/2009 | Philippi et al. | |
| 2009/0206065 A1* | 8/2009 | Kruth .................. | B22F 3/1055 219/121.66 |
| 2010/0086003 A1 | 4/2010 | Pfitzner et al. | |
| 2010/0134628 A1 | 6/2010 | Pfitzner et al. | |
| 2010/0225926 A1* | 9/2010 | van Amstel .......... | G01B 11/026 356/511 |
| 2010/0231925 A1* | 9/2010 | Okuda .................. | G01B 11/03 356/614 |
| 2010/0258544 A1* | 10/2010 | Kurita .................. | B23K 26/032 219/121.72 |
| 2011/0006231 A1* | 1/2011 | Betzig ...................... | G01J 9/00 250/578.1 |
| 2011/0204256 A1* | 8/2011 | Patt ........................ | G01N 15/14 250/458.1 |
| 2011/0222051 A1* | 9/2011 | Heng .................. | G01N 15/147 356/73 |
| 2011/0224574 A1* | 9/2011 | Sadler ................ | G01N 33/5091 600/562 |
| 2011/0284512 A1 | 11/2011 | Stork Genannt Wersborg | |
| 2013/0168902 A1* | 7/2013 | Herzog .................. | B22F 3/1055 264/401 |
| 2015/0048064 A1* | 2/2015 | Cheverton ............ | B22F 3/1055 219/121.63 |
| 2015/0338639 A1* | 11/2015 | Matsumoto ........ | G02B 21/0032 359/279 |

\* cited by examiner

SYSTEM AND METHODS FOR REAL-TIME ENHANCEMENT OF BUILD PARAMETERS OF A COMPONENT

BACKGROUND

The subject matter disclosed herein relates generally to additive manufacturing systems and, more particularly, to methods and systems for real-time enhancement of the build parameters of additive manufactured components.

At least some additive manufacturing systems involve the buildup of a powdered material to make a component. This method can produce complex components from expensive materials at a reduced cost and with improved manufacturing efficiency. At least some known additive manufacturing systems, such as Direct Metal Laser Melting (DMLM) systems, fabricate components using a laser device and a powder material, such as, without limitation, a powdered metal. While DMLM is used herein, this term is also sometimes referred to as Direct Metal Laser Sintering (DMLS) and Selective Laser Sintering (SLS). In some known DMLM systems, component quality may be impacted by excess heat and/or variation in heat being transferred to the metal powder by the laser device within the melt pool.

In some known DMLM systems, component surface quality, particularly overhang or downward facing surfaces, is reduced due to the variation in conductive heat transfer between the powdered metal and the surrounding solid material of the component. As a result, local overheating may occur, particularly at the overhang surfaces. The melt pool produced by the laser device may become too large resulting in the melted metal spreading into the surrounding powdered metal as well as the melt pool penetrating deeper into the powder bed, pulling in additional powder into the melt pool. The increased melt pool size and depth, and the flow of molten metal may generally result in a poor surface finish of the overhang or downward facing surface.

In addition, in some known DMLM systems, the component's dimensional accuracy and small feature resolution may be reduced due to melt pool variations because of the variability of thermal conductivity of the subsurface structures and metallic powder. As the melt pool size varies, the accuracy of printed structures may vary, especially at the edges of features.

Both of these challenges are geometry dependent. As a result, an adaptive build parameter needs to be used for every build vector to maintain control over the melt pool size. By enhancing the build parameters of the component in real-time, the quality of the surface finish throughout the printed component as well as the shape accuracy of the part may be improved. In addition, small feature resolution, often lost because of varying thermal conductivity, may also be enhanced.

BRIEF DESCRIPTION

In one aspect, a direct metal laser melting (DMLM) system for fabricating a component is provided. The DMLM system includes a laser device configured to generate a melt pool in a powder bed based on a build parameter. The DMLM system further includes a confocal optical system directed at the melt pool and configured to receive an optical signal emitted by the melt pool. In addition, the DMLM system includes an optical sensor operatively coupled to the confocal optical system. The optical sensor is configured to receive the optical signal and to generate an electrical signal in response. Furthermore, the DMLM system includes a computing device configured to receive the electrical signal and to generate a control signal in response. The control signal is configured to modify the build parameter of the direct metal laser melting system in real-time to adjust at least one of a melt pool size and a melt pool temperature to achieve a desired physical property of the component.

In another aspect, a method for controlling a DMLM device is provided. The method includes generating a melt pool based on at least one build parameter. In addition, the method includes detecting an optical signal emitted by the melt pool to measure at least one of a size and a temperature of the melt pool. Furthermore, the method includes modifying in real-time the at least one build parameter based on at least one of the size and the temperature of the melt pool to achieve a desired physical property.

In yet another aspect, a method for enhancing build parameters for fabricating a component using a DMLM device is provided. The method includes generating a melt pool in a powder bed based on at least one build parameter. The method also includes transmitting an optical signal emitted by the melt pool to at least one optical sensor. In addition, the method includes limiting the amount of out-of-focus emissions from the optical signal using a confocal optical system including at least one pinhole aperture device. Furthermore, the method includes determining at least one of a size of the melt pool and a temperature of the melt pool based on the optical signal, and modifying in real-time the at least one build parameter based on at least one of the size and the temperature of the melt pool to achieve a desired physical property.

DRAWINGS

These and other features, aspects, and advantages of the present disclosure will become better understood when the following detailed description is read with reference to the accompanying drawings in which like characters represent like parts throughout the drawings, wherein.

Figure 1:
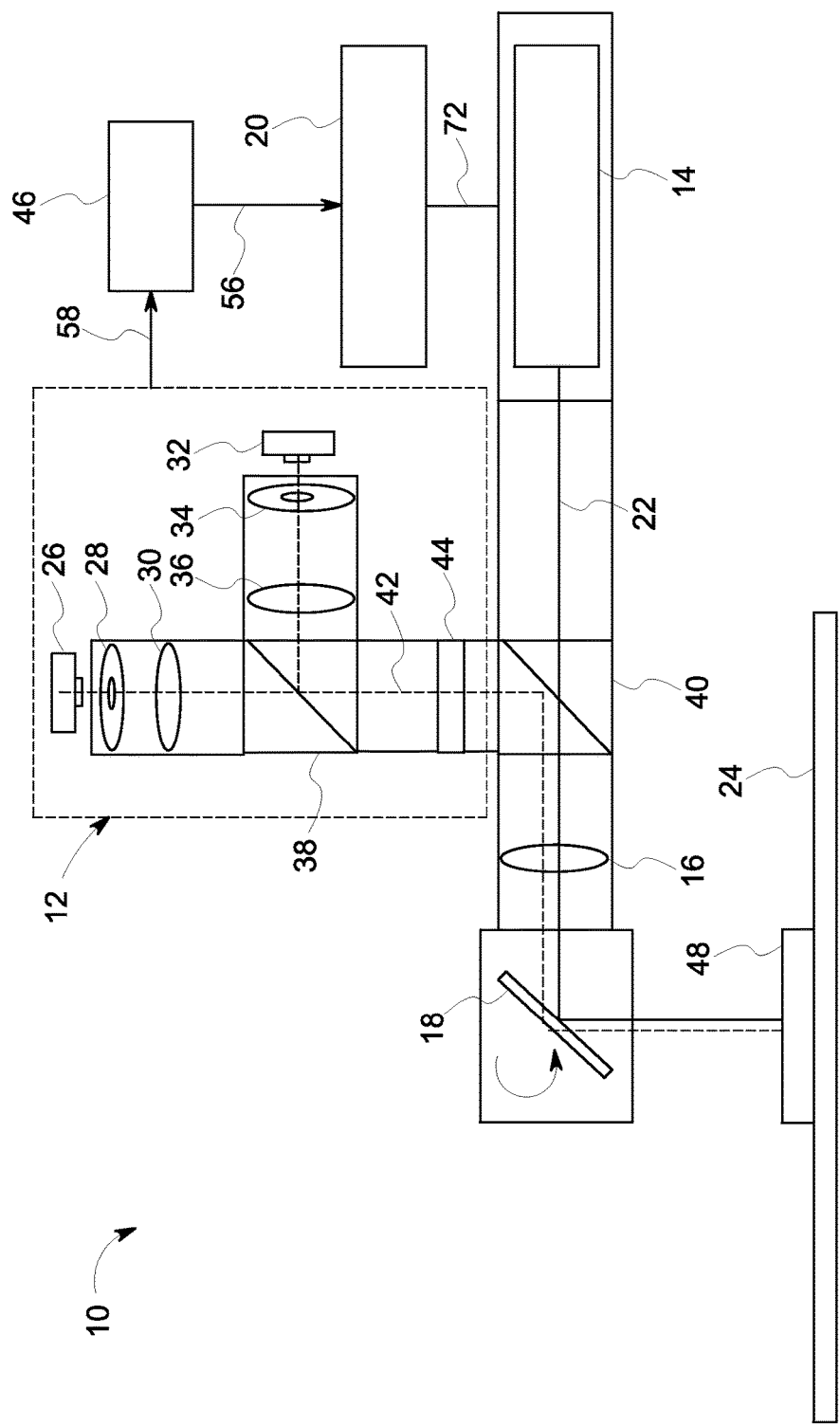
FIG. 1 is a schematic view of an exemplary direct metal laser melting (DMLM) system including an exemplary confocal optical system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The systems described herein can include or represent hardware and associated instructions (e.g., software stored on a tangible and non-transitory computer readable storage medium, such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein from the instructions described above. Additionally or alternatively, one or more of these devices may be hard-wired with logic circuits to perform these operations.

The systems and methods described herein relate to real-time analysis and potential adjustment of the build parameters of a direct metal laser melting (DMLM) component based on observation of a melt pool generated during fabrication of the component. The melt pool is generated and maintained through the interaction with the laser beam, which provides a high-intensity heat source. The substrate is scanned relative to the beam. As the scanning progresses, the melted substrate region and the melted deposition material solidify, and a clad track is deposited on the surface. A layer is successively formed by depositing successive tracks side-by-side. Multilayer structures are generated by depositing multiple tracks on top of each other.

In one embodiment, a DMLM system includes at least one laser device, which provides a high-intensity heat source, configured to generate the melt pool in a powdered material. The powdered material is scanned by the laser device and a small amount of the powdered material is melted at the focal point of the laser device. The DMLM system also includes a confocal optical system coupled to a DMLM machine. The confocal optical system includes at least one high numerical aperture (NA) lens and at least one pinhole aperture device optically coupled to at least one optical sensor configured to receive an optical signal from the confocal optical system and to generate an electrical signal substantially representative of the optical signal in response. The optical sensor may be one of a camera, a pyrometer, a photomultiplier tube, or a photodiode. The confocal optical system is configured to limit an amount of collateral illumination from the melt pool (sparks and plasma over the melt pool as well as neighboring melt pools that may still be glowing).

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously. In one example, real-time refers to the ability to adjust the component build parameters during the build process at the layer level so that if the measurement data indicates the melt pool size and/or temperature is drifting from an optimal state, the build parameters are adjusted so that the melt pool size and/or temperature stay within the desired thresholds.

In operation, the closed-loop control of the DMLM system includes using a three dimensional (3D) computer model to fabricate a component that includes real-time feedback of certain properties of the melt pool used to consider whether to adjust the build parameters of the component. The laser device of the DMLM machine heats a powdered metal to form a melt pool. A controller coupled to the DMLM machine controls operation of a galvanometer, which guides the laser device output, and thereby the melt pool, along a predetermined path in the powdered metal. As the laser traverses the predetermined path, the melt pool cools, forming a hardened metal structure. The confocal optical system monitors the size and/or the temperature of the melt pool as the DMLM machine forms each layer of the component. In one embodiment, the size and/or temperature of the melt pool are compared in real-time to a calibration model of the DMLM machine. The calibration model of the DMLM machine includes data of the melt pool size and temperature at various operating conditions of the DMLM machine. If the size and/or temperature of the melt pool are outside predetermined limits from the calibration model at a specific operating condition, a computing device generates control signals in response. In another embodiment, historical data for the component design is used to establish the thresholds or limits for the size and/or temperature of the melt pool. Since the system continually monitors the melt pool properties during the component build process for each machine, the historical data associated with the component and the machine can establish a mechanism to adjust the thresholds to facilitate increasing the number of quality components that are produced by a specific machine. In addition, since each component has a unique identifier, the quality control and product life can be integrated into the prognostic determination to establish the optimal thresholds.

Using the control signals generated by the computing device, the build parameters for the component, such as, without limitation, the power output, the vector scanning speed, the raster power output, the raster scanning speed, the raster tool path, and the contour power output of the laser device are adjusted in real-time to correct for potential problems. Monitoring and adjusting the melt pool size and/or temperature in real-time facilitates enhancing the build parameters used by the DMLM machine to fabricate the component. Enhancing the build parameters in real-time further facilitates improving the quality of the component, e.g., without limitation, the physical properties such as, without limitation, dimensions, feature resolution, overhang quality, and surface finish.

FIG. 1 is a schematic view of an exemplary direct metal laser melting (DMLM) system 10 including an exemplary confocal optical system 12. In the exemplary embodiment, DMLM system 10 includes a laser device 14 optically coupled to optics 16 and galvanometers 18 for controlling the scanning of laser device 14. Alternatively, DMLM system 10 may include more than one laser device. For example, without limitation, an alternative DMLM system may have a first laser device having a first power and a second laser device having a second power different from the first laser power, or an alternative DMLM system may have at least two laser devices having substantially the same power output. Further, alternatively, DMLM system 10 may include any combination of laser devices that enable DMLM 10 to operate as described herein.

In the exemplary embodiment, DMLM system 10 also includes a computer control system, or controller 20. Galvanometers 18 are controlled by controller 20 and deflect a beam 22 generated by laser device 14 along a predetermined path on a powder bed 24. Galvanometers 18 may include two-dimension (2D) scan galvanometers, three-dimension (3D) scan galvanometers, dynamic focusing galvanometers, and/or any other galvanometer system that may be used to deflect beam 22 of laser device 14. Alternatively, DMLM system 10 may include more than one galvanometer 18, e.g., without limitation, a galvanometer 18 for each laser device 14.

DMLM system 10 is operated to fabricate a component 48 by a layer-by-layer manufacturing process, i.e., an additive manufacturing process. Component 48 is typically fabricated from an electronic representation of the 3D geometry of component 48. The electronic representation may be produced in a computer aided design (CAD) file, a scanned model, or a similar file. The electronic representation of component 48 is converted into a layer-by-layer format that includes a plurality of build parameters 72 for each layer. In the exemplary embodiment, component 48 is arranged electronically in a desired orientation relative to the origin of the coordinate system used in DMLM system 10. The geometry of component 48 is sliced into a stack of layers of a desired thickness, such that the geometry of each layer is an outline of the cross-section through component 48 at that particular layer location. A "toolpath" or "toolpaths" are generated across the geometry of a respective layer. Build parameters 72 are applied along the toolpath or toolpaths to fabricate that layer of component 48 from the material used to construct component 48. The steps are repeated for each respective layer of component 48 geometry. Once the process is completed, an electronic computer build file 54 (or files) (not shown in FIG. 1) is generated including all of the layers of component 48. Build file 54 is transmitted to controller 20 of DMLM system 10 to control the system during fabrication of each layer of component 48.

After build file 54 is transmitted to controller 20, DMLM system 10 is operated to generate component 48 by implementing the layer-by-layer manufacturing process, such as, without limitation, a direct metal laser melting method. The exemplary layer-by-layer additive manufacturing process does not use a pre-existing article as the precursor to the final component, rather the process produces component 48 from a raw material in an easily configurable form, such as, without limitation, a powder. For example, without limitation, a steel component may be additively manufactured using a steel powder. DMLM system 10 enables fabrication of components using a broad range of materials, for example, without limitation, metals, ceramics, and polymers.

As used herein, the term "parameter" refers to characteristics that can be used to define the operating conditions of DMLM system 10, such as, without limitation, a power output of laser device 14, a vector scanning speed of laser device 14, a raster power output of laser device 14, a raster scanning speed of laser device 14, a raster tool path of laser device 14, and a contour power output of laser device 14 within DMLM system 10. The parameters represent a given operating state of DMLM system 10 and may be initially input or adjusted by a user into controller 20 or established via computer software and a database of the parameters. In general, during raster scanning, beam 22 is scanned sequentially along a series of substantially straight lines spaced apart and parallel to each other. During vector scanning, beam 22 is generally scanned sequentially along a series of substantially straight lines or vectors, where the orientations of the vectors relative to each other may vary. In general, the ending point of one vector may coincide with the beginning point of the next vector. Vector scanning is generally used to define the outer contours of a component, whereas raster scanning is generally used to "fill" the spaces enclosed by the contour, where the component is solid.

In the exemplary embodiment, confocal optical system 12 includes at least one optical sensor 26, at least one pinhole aperture device 28, and at least one high numerical aperture (NA) objective lens 30. In the exemplary embodiment, confocal optical system 12 includes two optical sensors 26 and 32 coupled to objective lens 30 and 36 and pinhole aperture devices 28 and 34, respectively. Pinhole aperture devices 28 and 34 are configured to limit or reduce the amount of out-of-focus emissions from an optical signal 42 transmitted by a melt pool area 50 from reaching optical sensors 26 and 32, respectively, and creating an undesirable background signal. The size of the opening in pinhole aperture devices 28 and 34 is predetermined based on calibration data acquired from DMLM system 10, and substantially corresponds to the dimensions of the optimal melt pool area 50. Alternatively, pinhole aperture devices 28 and 34 may be adjustable so that a size of the opening in pinhole aperture devices 28 and 34 may be changed to accommodate differing melt pool areas. In general, pinhole aperture devices 28 and 34 are sized to correspond to melt pool area 50 (not shown in FIG. 1). Alternatively, pinhole aperture devices 28 and 34 may be dimensioned to any size that enables confocal optical system 12 to operate as described herein.

Figure 2:
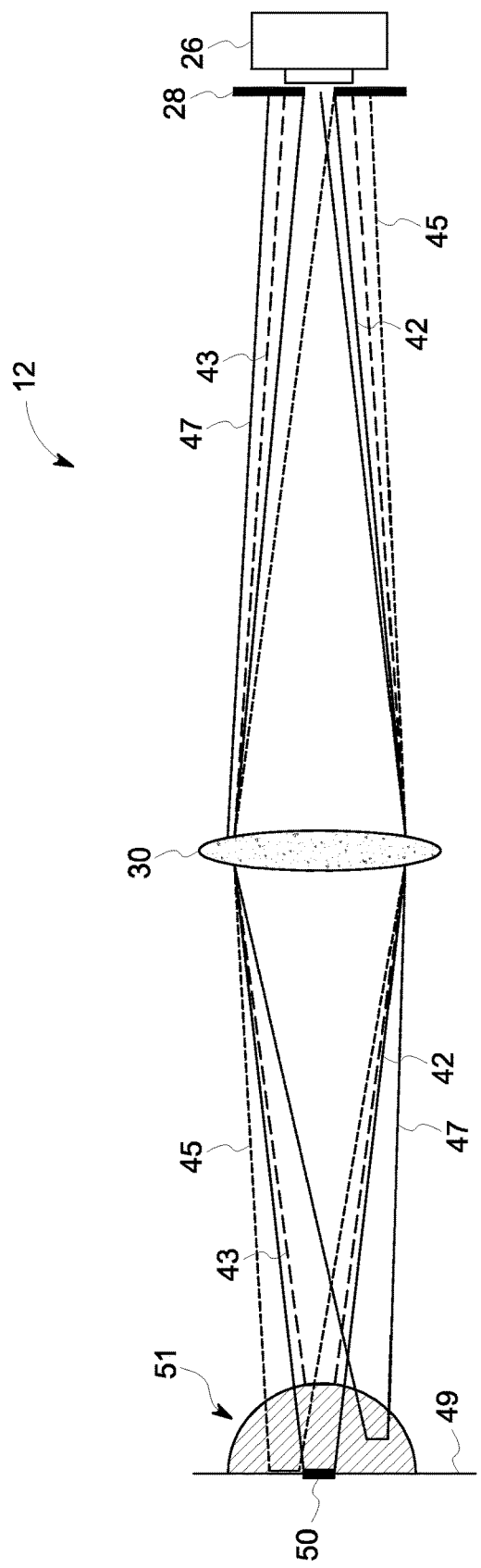
FIG. 2 is a schematic view of a portion of the confocal optical system shown in FIG. 1.

FIG. 2 is a schematic view of a portion of confocal optical system 12 shown in FIG. 1. In the exemplary embodiment, confocal optical system 12 uses the principle of confocal imaging. Confocal imaging is an imaging technique that uses point illumination and limits the effective dimensions of the at least one optical sensor 26 with the at least one pinhole aperture device 28 to facilitate improving optical resolution and contrast by limiting the amount of collateral illumination 51 that reaches the at least one optical sensor 26. In general, to create an image with confocal optical system 12, the size of the opening in the at least one pinhole aperture device 28 coincides with the image of melt pool area 50 in the optically conjugate plane of confocal optical system 12. Collateral illumination 51 from the melt pool, which is located out of the focal plane 49 of melt pool area 50 or outside the melt pool area 50 is generally rejected by the at least one pinhole aperture device 28 and the resulting out-of-focus emissions from optical signal 42 are reduced.

In the exemplary embodiment, optical signal 42 corresponds to the size of melt pool area 50. Objective lens 30 receives optical signal 42 from melt pool area 50 and focuses optical signal 42 through pinhole aperture device 28, which is located at the optically conjugate plane. Optical sensor 26 thus receives a focused optical signal 42 of melt pool area 50.

In the exemplary embodiment, an axially offset optical signal 43, which is represented by a portion of collateral illumination 51 is offset axially from conjugate plane 49, passes through objective lens 30 and is converged toward pinhole aperture device 28. However, as shown in FIG. 2, only a portion of optical signal 43 passes through pinhole aperture device 28. Furthermore, because optical signal 43 originates from a portion of collateral illumination 51 that is not in focal plane 49, the portion of optical signal 43 that passes through pinhole aperture device 28 is out of focus and generally less intense than focused optical signal 42. As the axial displacement of optical signal 43 increases from focal plane 49, the amount of optical signal 43 that passes through pinhole aperture device 28 decreases.

Furthermore, in the exemplary embodiment, a laterally offset optical signal 45, represented by a portion of collateral illumination 51 offset laterally from melt pool area 50 and in conjugate plane 49, passes through objective lens 30 and converges toward pinhole aperture device 28. However, as shown in FIG. 2, optical signal 45, while being in focus at pinhole aperture device 28, does not pass through pinhole aperture device 28. Thus, pinhole aperture device 28 is very effective at eliminating laterally offset collateral illumination 51. In the exemplary embodiment, melt pool area 50 can vary in size during operation of DMLM system 10 and pinhole aperture device 28 is configured to be slightly larger than an optimal melt pool area 50 size. Thus, a portion of collateral illumination 51 can pass through pinhole aperture device 28. As the lateral displacement of optical signal 45 increases from melt pool area 50, the amount of optical signal 45 that passes through pinhole aperture device 28 decreases.

Optical signal 47, represented by a portion of collateral illumination 51 offset both axially in conjugate plane 49 and laterally from melt pool area 50, passes through objective lens 30 and is converged toward pinhole aperture device 28. However, as shown in FIG. 2, only a portion of optical signal 47 passes through pinhole aperture device 28. Furthermore, because optical signal 47 originates from a portion of collateral illumination 51 that is not in focal plane 49, the portion of optical signal 47 that passes through pinhole aperture device 28 is out of focus. As described herein, as the axial displacement of optical signal 47 increases from focal plane 49, the amount of optical signal 47 that passes through pinhole aperture device 28 decreases. Further, as the lateral displacement of optical signal 47 increases from melt pool area 50, the amount of optical signal 47 that passes through pinhole aperture device 28 decreases. Thus as described herein, pinhole aperture device 28 facilitates improving optical resolution and contrast by limiting the amount of collateral illumination 51 that reaches optical sensor 26.

With reference to FIG. 1, in the exemplary embodiment, confocal optical system 12 includes one or more beam splitters 38 and 40. Beam splitter 40 is placed in the path of beam 22 and facilitates confocal optical system 12 viewing powder bed 24 coaxially with beam 22. Beam splitter 40 is configured to direct optical signal 42 to beam splitter 38. Beam splitter 38 further divides optical signal 42 and directs it towards the at least two optical sensors 26 and 32. Any combination of optical sensors 26 and 32 may be used. In the exemplary embodiment, optical sensors 26 and 32 are photomultiplier tubes. Alternatively, optical sensors 26 and 32 may be any one of several known optical sensors that enable confocal optical system 12 to operate as described herein, for example, without limitation, photodiodes, pyrometers, or cameras. In the exemplary embodiment, optical sensors 26 and 32 are configured to sample data at a data acquisition rate in the range between about 50 kilohertz (kHz) and about 250 kHz, and more particularly, in the range between about 100 kHz and about 200 kHz, and preferably, at a data acquisition rate of about 200 kHz. Optical sensors 26 and 32 receive optical signal 42 and transmit one or more electrical signals 58 to a computing device 46. As described in more detail below, electrical signals 58 are used to enhance build parameters 72 of component 48 in real-time to improve the shape accuracy and the quality of the surface finish throughout component 48.

While confocal optical system 12 is described as including optical sensors for receiving optical signal 42, it should be noted that use of the term "optical" is not to be equated with the term "visible." Confocal optical system 12 as described herein is configured to capture a wide spectral range. Optical sensors 26 and 32 are sensitive detectors of light with wavelengths in the ultraviolet range (about 200-400 nanometers (nm)), visible range (about 400-700 nm), near-infrared range (about 700-1,200 nm), and infrared range (about 1,200-10,000 nm) of the electromagnetic spectrum. The wavelengths emitted by melt pool area 50 depend on the temperature of melt pool area 50. Accordingly, confocal optical system 12 is capable of monitoring and measuring both a size and/or a temperature of melt pool area 50.

In the exemplary embodiment, confocal optical system 12 includes an optical filter 44. Optical filter 44 may be used to filter specific portions of the spectrum comprising optical signal 42 to facilitate enhancing optical signal 42 received by optical sensors 26 and 32. Optical filter 44 facilitates blocking wavelengths substantially similar to beam 22 from optical signal 42, and/or to enable specific wavelengths to pass. In the exemplary embodiment, optical filter 44 is placed in the optical path before beam splitter 38, thereby affecting optical signal 42 before it reaches any of optical sensors 26 and 32. Alternatively, optical filter 44 may be placed after beam splitter 38 to affect only the portion of optical signal 42 that reaches optical sensor 26 or optical sensor 32, respectively. Alternatively, the spectral properties of beam splitter 38 may be altered to provide a desired optical filtering performance.

In the exemplary embodiment, controller 20 is any type of controller typically provided by a manufacturer of DMLM system 10 to control operation of DMLM system 10. Controller 20 may be a computer system that includes at least one processor (not shown) and at least one memory device (not shown) that executes executable instructions to control the operation of DMLM system 10 based at least partially on instructions from human operators. Controller 20 may include, for example, a 3D model of component 48 to be fabricated by DMLM system 10. Executable instructions executed by controller 20 may include controlling power output of laser device 14 and adjusting galvanometers 18 to control the scanning speed of laser device 14 within DMLM system 10.

Figure 3:
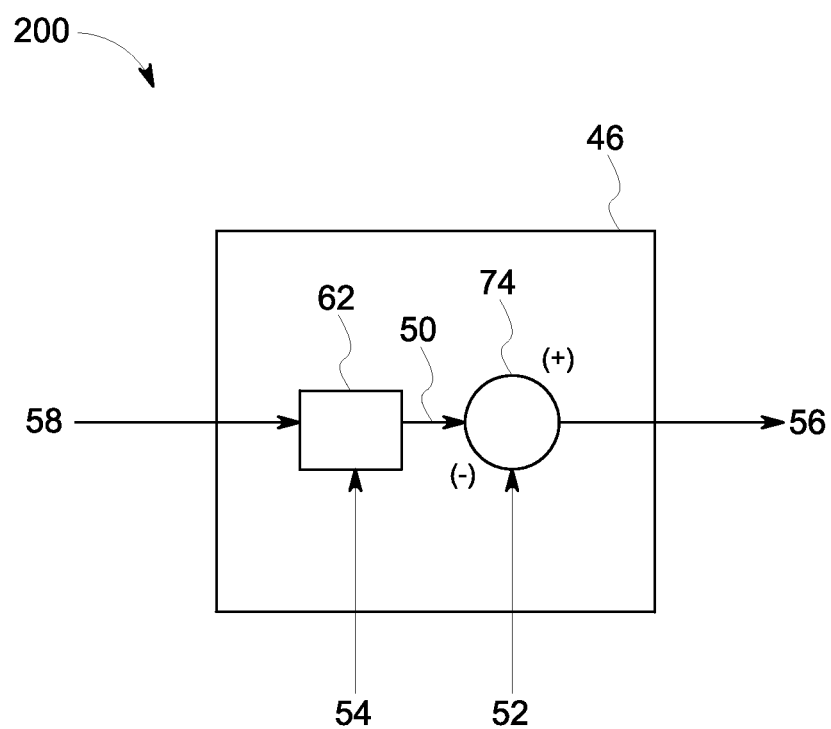
FIG. 3 is a schematic view of exemplary control architecture for use with a computing device used with the DMLM system shown in FIG. 1.

In the exemplary embodiment, DMLM system 10 includes computing device 46 that operates at least partially as a data acquisition device and monitors the operation of DMLM system 10 during fabrication of component 48. Referring to FIG. 1 and FIG. 3, computing device 46 may be a computer system that includes at least one processor 62 that executes executable instructions to operate DMLM system 10 based at least partially on electrical signals 58 received from optical sensors 26 and 32. Computing device 46 may include, for example, a calibration model 52 of DMLM system 10 and build file 54. In the exemplary embodiment, computing device 46 and controller 20 are shown as separate devices. Alternatively, computing device 46 and controller 20 may be combined as a single device that operates as both computing device 46 and controller 20 as each are described herein.

FIG. 3 is a schematic view of an exemplary control architecture 200 for use with computing device 46 used with DMLM system 10 (shown in FIG. 1). In the exemplary embodiment, computing device 46 receives as inputs at least electrical signals 58. As described above, computing device 46 includes calibration model 52 of DMLM system 10 and build file 54 including build parameters 72, generally input by a user. As described in more detail below, as DMLM system 10 builds component 48, computing device 46 processes electrical signals 58 using data processing algorithms to determine the size and/or temperature of melt pool area 50. Computing device 46 compares melt pool area 50 to calibration model 52 using a comparison module 74 and generates control signals 56 that are fed back to controller 20 and used to adjust one or more build parameters 72 in real-time to correct discrepancies in melt pool area 50.

Figure 4:
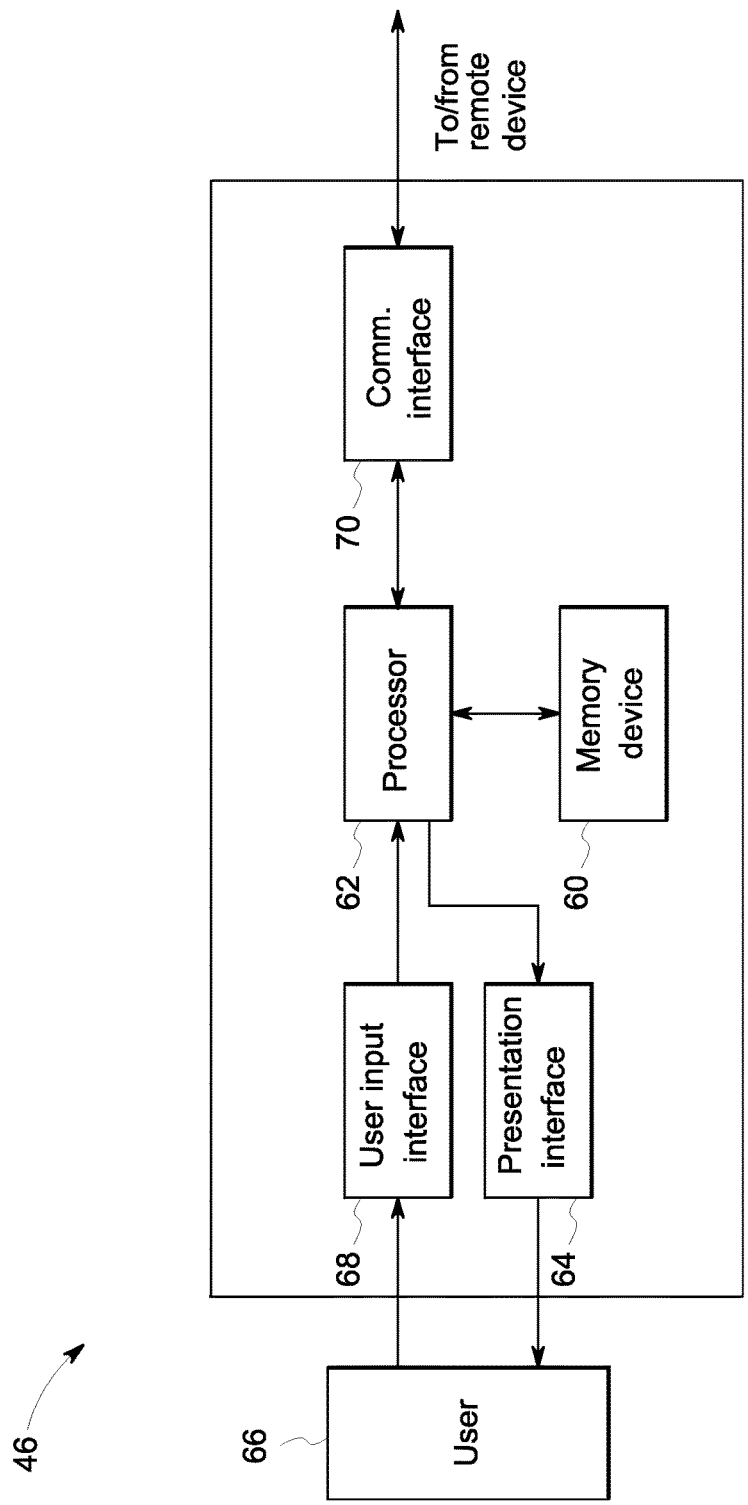
FIG. 4 is a block diagram of the computing device that may be used with the DMLM system shown in FIG. 1.

FIG. 4 is a block diagram of computing device 46 that may be used to perform data acquisition and monitoring of any piece of equipment, system, and process, such as, without limitation, acquiring data, and monitoring geometric conditions of component 48 during fabrication by DMLM system 10. In the exemplary embodiment, computing device 46 includes a memory device 60 and a processor 62 coupled to memory device 60. Processor 62 may include one or more processing units, such as, without limitation, a multi-core configuration. In the exemplary embodiment, processor 62 includes a field programmable gate array (FPGA). Alternatively, processor 62 may be any type of processor that enables computing device 46 to operate as described herein. In some embodiments, executable instructions are stored in memory device 60. Computing device 46 is configurable to perform one or more executable instructions described herein by programming processor 62. For example, processor 62 may be programmed by encoding an operation as one or more executable instructions and providing the executable instructions in memory device 60. In the exemplary embodiment, memory device 60 is one or more devices that enable storage and retrieval of information such as, without limitation, executable instructions or other data. Memory device 60 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

As used herein, the term "computer" and related terms, such as, "computing device" and "controller", are not limited to integrated circuits referred to in the art as a computer, but rather broadly refers to a microcontroller, a microcomputer, a field programmable gate array (FPGA), a programmable logic controller (PLC), an application specific integrated circuit, and other programmable circuits, and these terms are used interchangeably herein.

Memory device 60 may be configured to store calibration model 52, electrical signals 58, and build parameters 72, including, without limitation, real-time and historical build parameter values, or any other type of data. In some embodiments, processor 62 removes or "purges" data from memory device 60 based on the age of the data. For example, processor 62 may overwrite previously recorded and stored data associated with a subsequent time or event. In addition, or alternatively, processor 62 may remove data that exceeds a predetermined time interval. In addition, memory device 60 includes, without limitation, sufficient data, algorithms, and commands to facilitate monitoring and measuring electrical signals 58, build parameters 72, and the geometric conditions of component 48 being fabricated by DMLM system 10.

In some embodiments, computing device 46 includes a presentation interface 64 coupled to processor 62. Presentation interface 64 presents information, such as, without limitation, the operating conditions of DMLM system 10, to a user 66. In one embodiment, presentation interface 64 includes a display adapter (not shown) coupled to a display device (not shown), such as, without limitation, a cathode ray tube (CRT), a liquid crystal display (LCD), an organic LED (OLED) display, or an "electronic ink" display. In some embodiments, presentation interface 64 includes one or more display devices. In addition, or alternatively, presentation interface 64 includes an audio output device (not shown), for example, without limitation, an audio adapter or a speaker (not shown).

In some embodiments, computing device 46 includes a user input interface 68. In the exemplary embodiment, user input interface 68 is coupled to processor 62 and receives input from user 66. User input interface 68 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 64 and user input interface 68.

In the exemplary embodiment, a communication interface 70 is coupled to processor 62 and is configured to be coupled in communication with one or more other devices, such as, without limitation, optical sensors 26 and 32, and to perform input and output operations with respect to such devices while performing as an input channel. For example, communication interface 70 may include, without limitation, a wired network adapter, a wireless network adapter, a mobile telecommunications adapter, a serial communication adapter, or a parallel communication adapter. Communication interface 70 may receive a data signal from or transmit a data signal to one or more remote devices. For example, in an alternative embodiment, communication interface 70 of computing device 46 may transmit/receive a data signal to/from controller 20.

Presentation interface 64 and communication interface 70 are both capable of providing information suitable for use with the methods described herein, such as, without limitation, providing information to user 66 or processor 62. Accordingly, presentation interface 64 and communication interface 70 may be referred to as output devices. Similarly, user input interface 68 and communication interface 70 are capable of receiving information suitable for use with the methods described herein and may be referred to as input devices.

The methods described herein may be encoded as executable instructions and algorithms embodied in a tangible, non-transitory, computer readable medium, including, without limitation, a storage device and/or a memory device. Such instructions and algorithms, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs, and another digital source such as a network or the Internet, as well as yet to be developed digital means, with the sole exception being a transitory, propagating signal.

Figure 5:
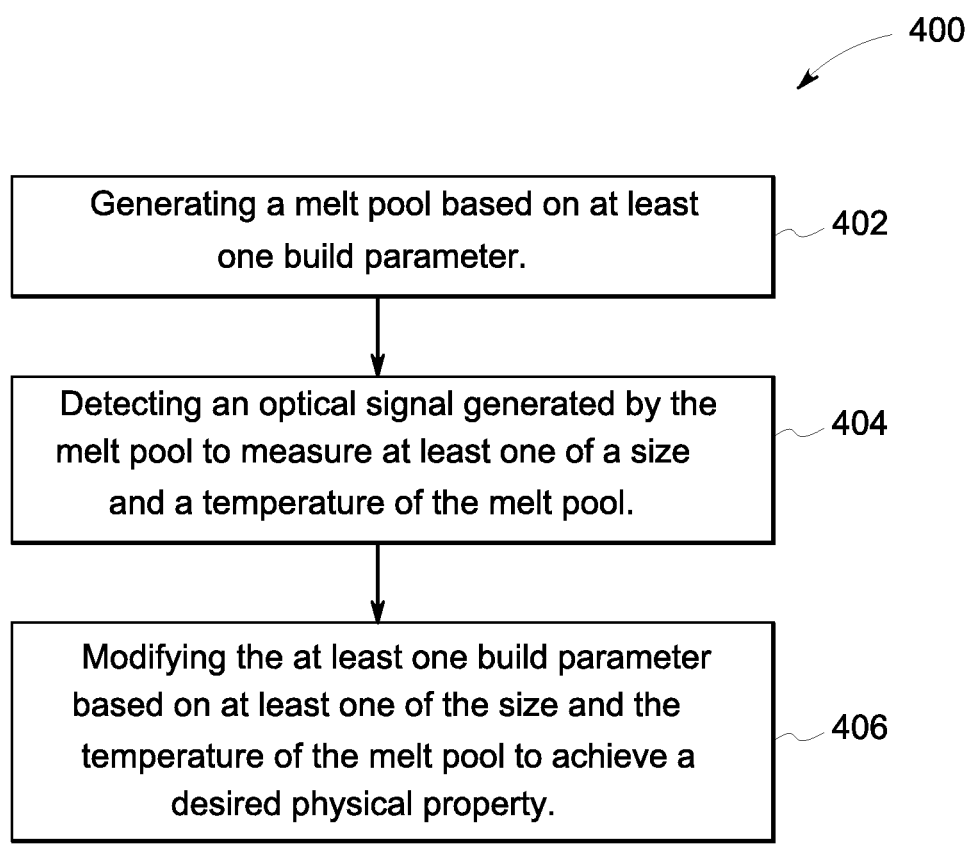
FIG. 5 is a flow chart of an exemplary feedback loop or closed-loop method that may be implemented to control operation of the DMLM system shown in FIG. 1.

FIG. 5 is a flow chart of an exemplary feedback loop or closed-loop method 400 that may be implemented to control operation of DMLM system 10 (shown in FIG. 1). Method 400 may be used for enhancing build parameters 72 in real-time for fabricating component 48 using DMLM system 10 in closed-loop control. Method 400 facilitates improving the quality of the surface finish on downward facing surfaces of component 48. In addition, method 400 facilitates improving small feature resolution often lost because of varying thermal conductivity within powder bed 24 during component fabrication.

Referring to FIGS. 1-5, to facilitate enhancing component build parameters 72, in the exemplary embodiment, controller 20 controls DMLM system 10 and directs beam 22 from laser device 14 onto powder bed 24 to generate 402 melt pool area 50 based on build parameters 72. Build parameters 72 may include, without limitation, a power output, a vector scanning speed, a raster power output, a raster scanning speed, a raster tool path, and a contour power output of laser device 14. Controller 20 controls the movement of galvanometers 18 to scan beam 22 across powder bed 24 according to a predetermined path defined by build file 54 for component 48.

In the exemplary embodiment, confocal optical system 12 detects 404 optical signal 42 to measure a size and/or a temperature of melt pool area 50 as beam 22 is scanned across powder bed 24. In the exemplary embodiment, a plurality of optical sensors 26 and 32, for example, without limitation, a photomultiplier tube, a photodiode, a camera, or a pyrometer, monitor and measure various geometric conditions of melt pool area 50, generating electrical signals 58 in response thereto. The geometric conditions monitored by optical sensors 26 and 32 are measured values indicative of the size and/or temperature of melt pool area 50.

In the exemplary embodiment, computing device 46 includes, for example, calibration model 52 of the DMLM system 10, comprising melt pool size and/or temperature data at various operating conditions of DMLM system 10. Furthermore, computing device 46 receives an input build file 54 for component 48. Computing device 46 (shown in FIG. 1) receives electrical signals 58 from confocal optical system 12 that correlate to the size and/or temperature of melt pool area 50. More specifically, computing device 46 receives electrical signals 58 from optical sensors 26 and 32 and processes them using processing algorithms to determine the size and/or temperature of melt pool area 50. Computing device 46 compares, in real-time, the size and/or temperature of melt pool area 50 to calibration model 52 of DMLM system 10 to determine a difference value between a nominal melt pool area and the measured melt pool area of DMLM system 10 to generate control signals 56.

After determining the size and/or temperature of melt pool area 50, computing device 46 generates control signals 56 that are transmitted to controller 20 to modify 406 build parameters 72 in real-time to achieve a desired physical property of component 48, such as, without limitation, a component dimension, a surface finish, an overhang quality, and a feature resolution. For example, without limitation, if computing device 46 determines that the size of melt pool area 50 is too large, or the temperature is too high, computing device 46 may generate control signals 56 that are used by controller 20 to reduce the power output of laser device 14 or increase the scanning speed of laser device 14 to reduce the size and/or temperature of melt pool area 50. Alternatively, control signals 56 may be used to modify more than one build parameter 72, such as, a combination of the power output and scanning speed of laser device 14. The modified build parameters 72 are fed back to controller 20 of DMLM system 10 and are used to generate 402 melt pool area 50 based on the new build parameters 72.

Figure 6:
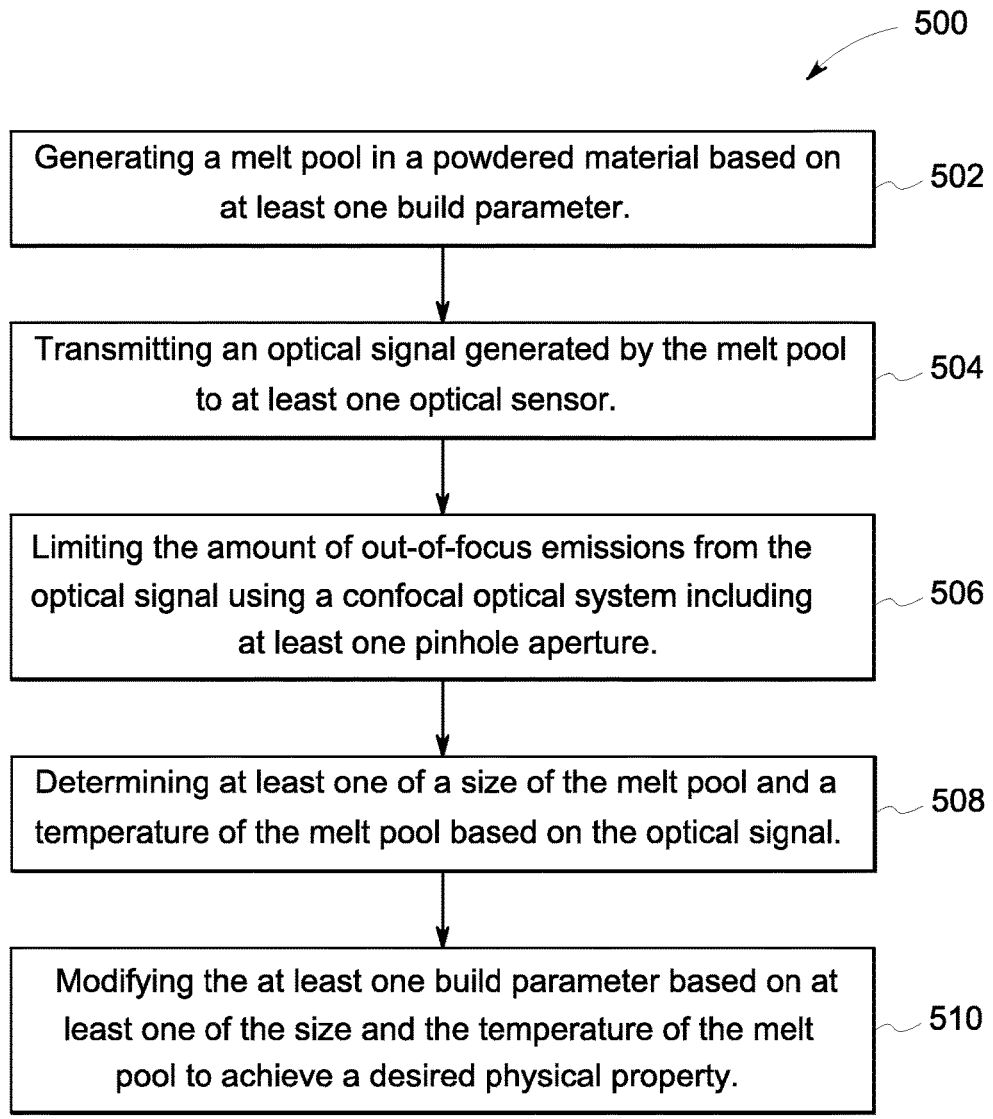
FIG. 6 is a flow chart of an exemplary feedback loop or closed-loop method that may be implemented to enhance build parameters used for fabricating a component using the DMLM system shown in FIG. 1.

FIG. 6 is a flow chart of an exemplary feedback loop or closed-loop method 500 that may be implemented to enhance build parameters 72 (shown in FIG. 1) used for fabricating component 48 (shown in FIG. 1) using DMLM system 10 (shown in FIG. 1). Method 500 may be used for enhancing build parameters 72 in real-time using closed-loop control. Method 500 facilitates improving the quality of the surface finish on downward facing surfaces of component 48. In addition, method 500 facilitates improving small feature resolution often lost because of varying thermal conductivity within powder bed 24 during component fabrication. Referring to FIGS. 1-3 and 5, to facilitate enhancing build parameters 72 of component 48, in the exemplary embodiment, controller 20 controls DMLM system 10 and directs beam 22 from laser device 14 onto powder bed 24 to generate 502 melt pool area 50 based on build parameters 72. Build parameters 72 may include, without limitation, a power output, a vector scanning speed, a raster power output, a raster scanning speed, a raster tool path, and a contour power output of laser device 14.

In the exemplary embodiment, controller 20 controls the movement of galvanometers 18 to scan beam 22 across powder bed 24 according to a predetermined path defined by build file 54 for component 48. As beam 22 is scanned across powder bed 24, melt pool area 50 emits optical signal 42. Optical signal 42 is transmitted 504 to optical sensors 26 and 32 of confocal optical system 12. Optical sensors 26 and 32 may include for example, without limitation, a photomultiplier tube, a photodiode, a camera, or a pyrometer. In the exemplary embodiment, optical sensors 26 and 32 are coupled to objective lenses 30 and 36 and pinhole aperture devices 28 and 34, respectively. Pinhole aperture devices 28 and 34 limit 506 or reduce the amount of out-of-focus emissions from optical signal 42 from reaching optical sensors 26 and 32, respectively. Optical sensors 26 and 32 generate electrical signals 58 based on optical signal 42 received from melt pool area 50. Computing device 46 receives electrical signals 58 from optical sensors 26 and 32 of confocal optical system 12. Electrical signals 58 correlate to the size and/or temperature of melt pool area 50. Computing device 46 compares, in real-time, the size and/or temperature of melt pool area 50 to calibration model 52 of DMLM system 10 to determine 508 a difference value between a nominal melt pool area and the measured melt pool area of DMLM system 10 to generate control signals 56. Control signals 56 are transmitted to controller 20 and are used to modify 510 build parameters 72 in real-time to fabricate component 48 with improved physical properties, such as, without limitation, component dimensions, surface finish, overhang quality, and feature resolution.

In the exemplary embodiment, DMLM system 10 operates in a feedback loop or closed-loop manner such that following modification 510 of build parameters 72, DMLM system 10 uses the modified build parameters to generate 502 melt pool area 50 followed by optical sensing 504, limiting out-of-focus emissions 506, determining 508 properties of melt pool area 50, and modifying 510 build parameters 72. This feedback loop continues throughout DMLM system 10 processing of component 48.

The systems and methods as described herein facilitate real-time enhancement of the build parameters used by a DMLM machine to fabricate a component. Specifically, the systems and methods described facilitate closed-loop control of a DMLM machine by monitoring a melt pool size and correlating the size to a build parameter of the component build file, then adjusting the build parameter in real-time based on a comparison of the melt pool size with a calibration model. Enhancing the build parameters facilitates improving the quality of the component, e.g., without limitation, the physical properties such as dimensions, feature resolution, overhang quality, and surface finish. Therefore, in contrast to known DMLM systems that do not adjust the component build parameters, the systems, and methods described herein facilitate improving quality of the surface finish on downward facing surfaces of the component. In addition, small feature resolution, often lost because of varying thermal conductivity, may also be enhanced.

An exemplary technical effect of the methods and systems described herein includes: (a) generating a melt pool based on the build parameters of the component; (b) detecting an optical signal emitted by the melt pool to measure the size or the temperature of the melt pool; and (c) modifying the build parameters in real-time based on the size or the temperature of the melt pool to achieve a desired physical property of the component.

Some embodiments involve the use of one or more electronic or computing devices. Such devices typically include a processor or controller, such as, without limitation, a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments for enhancing the build parameters for making additive manufactured components are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with electronic components as described herein. Rather, one or more embodiments may be implemented and utilized in connection with other industries.

Although specific features of various embodiments of the invention may be shown in some drawings and not in others, this is for convenience only. In accordance with the principles of the invention, any feature of a drawing may be referenced or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct metal laser melting system for fabricating a component, said system comprising:
    a laser device configured to generate a melt pool in a powder bed based on a build parameter;
    a confocal optical system directed at the melt pool and configured to receive an optical signal emmitted by the melt pool;
    an optical sensor operatively coupled to said confocal optical system and configured to receive the optical signal and generate an electrical signal in response thereto; and
    a computing device configured to receive the electrical signal and to generate a control signal in response thereto, said control signal configured to modify the build parameter of the direct metal laser melting system in real-time to adjust at least one of a melt pool size and a melt pool temperature to achieve a desired physical property of the component, wherein the optical signal corresponds to one or more of the following: the melt pool size and the melt pool temperature.

2. The system in accordance with claim 1, wherein said computing device comprises a calibration model of said direct metal laser melting system, said computing device further configured to compare at least one of the melt pool size and the melt pool temperature to the calibration model to generate the control signal.

3. The system in accordance with claim 1, wherein said confocal optical system comprises a pinhole aperture device that limits the amount of out-of-focus emissions from the optical signal.

4. The system in accordance with claim 1, wherein the physical property of the component includes one or more of the following: a dimension, a surface finish, an overhang quality, and a feature resolution.

5. The system in accordance with claim 1, wherein said optical sensor comprises one or more of the following: a photomultiplier tube, a photodiode, a camera, and a pyrometer.

6. The system in accordance with claim 1, wherein said confocal optical system comprises a high numerical aperture objective lens.

7. The system in accordance with claim 1, wherein said confocal system comprises a beam splitter.

8. The system in accordance with claim 1, wherein the build parameter includes one or more of the following: a power output, a vector scanning speed, a raster power output, a raster scanning speed, a raster tool path, and a contour power output of said laser device.

9. A method for controlling a direct metal laser melting system, the method comprising:
    generating a melt pool based on at least one build parameter;
    detecting an optical signal emitted by the melt pool to measure at least one of a size and a temperature of the melt pool; and
    modifying in real-time the at least one build parameter based on at least one of the size and the temperature of the melt pool to achieve a desired physical property, wherein detecting an optical signal comprises detecting the optical signal with a confocal optical system including at least one optical sensor.

10. The method in accordance with claim 9, wherein detecting an optical signal with a confocal optical system comprises detecting the optical signal with one or more of the following: a photomultiplier tube, a photodiode, a camera, and a pyrometer.

11. The method in accordance with claim 9, wherein generating a melt pool based on at least one build parameter comprises generating the melt pool with a laser device based on one or more of the following: a power output, a vector scanning speed, a raster power output, a raster scanning speed, a raster tool path, and a contour power output of the laser device.

12. The method in accordance with claim 9, wherein the desired physical property includes one or more of the following: a component dimension, a surface finish, an overhang quality, and a feature resolution.

13. The method in accordance with claim 9, wherein modifying the at least one build parameter comprises comparing at least one of the measured size and temperature of the melt pool to a calibration model to generate a control signal.

14. The method in accordance with claim 13, wherein comparing at least one of the measured size and temperature of the melt pool to a calibration model comprises comparing at least one of the measured size and temperature of the melt pool to a calibration model using a computing device coupled to the direct metal laser melting system.

15. A method for enhancing build parameters for fabricating a component using a direct metal laser melting system, the method comprising:
    generating a melt pool in a powder bed based on at least one build parameter;
    detecting the optical signal with a conical optical system including at least one optical sensor;
    transmitting an optical signal emitted by the melt pool to the at least one optical sensor;
    limiting the amount of out-of-focus emissions from the optical signal using the confocal optical system including at least one pinhole aperture device;
    determining at least one a size of the melt pool and a temperature of the melt pool based on the optical signal; and
    modifying in real-time the at least one build parameter based on at least one of the size and the temperature of the melt pool to achieve a desired physical property.

16. The method in accordance with claim 15, wherein transmitting an optical signal to at least one optical sensor comprises transmitting the optical signal to one or more of the following: a photomultiplier tube, a photodiode, a camera, and a pyrometer.

17. The method in accordance with claim 15, wherein generating a melt pool in a powder bed based on at least one build parameter comprises generating the melt pool in a powder bed using a laser device based on one or more of the following: a power output, a vector scanning speed, a raster power output, a raster scanning speed, a raster tool path, and a contour power output of the laser device.

18. The method in accordance with claim 15, wherein the desired set of physical properties includes one or more of the following: a component dimension, a surface finish, an overhang quality, and a feature resolution.

* * * * *